# United States Patent [19]

Sasamura et al.

[11] Patent Number: 4,495,528
[45] Date of Patent: Jan. 22, 1985

[54] MAGNETIC REPRODUCING SYSTEM FOR A DIGITAL SIGNAL

[75] Inventors: Kohhei Sasamura, Sagamihara; Masaru Moriyama, Yamato, both of Japan

[73] Assignee: Victor Company of Japan, Ltd., Kanagawa, Japan

[21] Appl. No.: 394,942

[22] Filed: Jul. 2, 1982

[30] Foreign Application Priority Data

Jul. 10, 1981 [JP] Japan .................. 56-107938
Oct. 13, 1981 [JP] Japan .................. 56-163123

[51] Int. Cl.$^3$ .............................. G11B 5/09
[52] U.S. Cl. ........................ 360/40; 360/46
[58] Field of Search .............. 360/40, 46, 67, 68

[56] References Cited

U.S. PATENT DOCUMENTS 3,585,314 6/1971 Korn .................... 360/124
4,234,898 11/1980 Nakagawa et al. ............ 360/40
4,367,495 1/1983 Mita et al. ................ 360/40

FOREIGN PATENT DOCUMENTS

3038997 7/1973 Fed. Rep. of Germany ...... 360/124
2420181 4/1972 France .................... 360/124
1091688 11/1967 United Kingdom ............ 360/124

Primary Examiner—Vincent P. Canney
Attorney, Agent, or Firm—Ladas & Parry

[57] ABSTRACT

A magnetic reproducing system reproduces a recording two-valued code signal from a magnetic recording medium, and detects the signal level of the reproduced signal to reproduce a digital signal of a desired two-valued code, where the recording two-valued code signal is obtained by passing the digital signal of the above desired two-valued code through a converter and a delay circuit and then feeding back this digital signal to carry out a modulo-2 addition. The magnetic recording medium is recorded with the above recording two-valued code signal. The magnetic reproducing system comprises a magnetic head for reproducing the two-valued code recorded on the magnetic recording medium, an equalizer for performing wave-equalization of the signal reproduced by the magnetic head, and a signal detection circuit for detecting the signal level of a three-valued code signal obtained from the above equalizer, to produce a two-valued detection signal in which signal levels corresponding to "+1" and "−1" of the three-valued code signal is set to a signal level "+1" and a signal level corresponding to "0" of the three-valued code signal is set to a signal level "0", as a reproduced output signal of the digital signal.

6 Claims, 30 Drawing Figures

MAGNETIC REPRODUCING SYSTEM FOR A DIGITAL SIGNAL

BACKGROUND OF THE INVENTION

The present invention generally relates to magnetic reproducing systems for reproducing a two-valved code (sign) signal recorded on a magnetic recording medium such as a magnetic tape, and more particularly to a magnetic reproducing system for a digital signal capable of finely reproducing the recorded two-valved code signal by accurately detecting the signal level.

Conventionally, a partial response system is known as one of the digital transmission systems. In this partial response system, level detection is performed with respect to a code signal received in a fine state as a code signal of a format different from that of a transmitted code signal, by taking into account the transmission characteristic of the transmission path. After performing the level detection, the code format of the reproduced code signal is restored into the code format of the transmitted original code signal. The above partial response system positively utilizes the interference between codes. Thus, the partial response system has conventionally been employed in digital transmission using a transmission path of relatively poor transmission characteristic.

On the other hand, in a magnetic recording and reproducing apparatuses, the response in the high-frequency range is quite poor upon recording and reproduction. In addition, the winding of a magnetic head shows a differentiating characteristic upon reproduction. As a result, the low-frequency component which is close to a DC component is greatly attenuated, and further, the high-frequency component is also attenuated. Accordingly, a method was conventionally used in which the partial response system is applied to the magnetic recording and reproduction of the digital signal, to record a digital signal of a code format in conformance with the magnetic recording and reproducing characteristic, and the digital signal is reproduced by discriminating the level of the reproduced signal waveform regardless of the amplitude deviation in the reproduced signal.

If the above digital signal is a signal obtained by subjecting an analog audio signal to digital pulse modulation and this digital signal is to be recorded onto a magnetic tape by a fixed magnetic head, it becomes necessary to perform the recording with a fairly high tape speed in order to obtain a desired transmission rate, because the gap width of the magnetic head cannot be set to a width narrower than a predetermined value due to limitations from the manufacturing point of view. However, if the tape speed is set to the above fairly high speed, the recording and reproducing time is greatly shortened since the length of the magnetic tape is limited. For example, it will be impossible to obtain a recording and reproducing time in the ordeer of one hour which is necessary for recording and reproducing a stereo program. Hence, the tape speed is reduced to 7.1 cm/sec, for example, to obtain the desired recording and reproducing time. Moreover, the above digital signal is divided and recorded onto a plurality of tracks (multi-tracks) along the longitudinal direction of the magnetic tape so as to reduce the transmission rate to a rate which can be transmitted when the tape speed is reduced.

In a conventional system for reproducing a magnetic tape recorded with the digital signal on multi-tracks, the high-frequency component attenuated during the magnetic recording and reproducing process of the signal reproduced from each track by the magnetic head, is compensated. In addition, a three-valued code signal is obtained according to the partial response system. The signal levels "+1" and "−1" of this three-valued code signal are converted into the level "+1", while the signal level "0" is maintained as the level "0", to convert the three-valued code signal into a two-valued code signal. Then, a control voltage which follows with an appropriate time constant even when there is amplitude deviation in the reproduced signal, is generated. Thereafter, the levels of the two-valued code signal and the above control voltage are compared in the conventional reproducing system, to restore and obtain the original two-valuedcode signal recorded upon recording.

However, in the above described conventional digital signal magnetic reproducing system, there is no self-clocking signal within the signal reproduced according to the partial response system. Thus, there was a disadvantage in that the circuit became complex, because of the need to perform a special signal processing to obtain a clock signal which is necessary when converting the three-valued code signal into the two-valued code signal. In addition, jitter is inevitably introduced within the reproduced signal due to irregularities in the tape travel and the like upon recording and reproduction, and it became difficult to match the timing of the above clock signal and the three-valued code signal. Further, the above three-valued code signal is supplied to one input terminal of a level comparator for obtaining the original two-valued code signal, and a reference signal is supplied to the other input terminal of the level comparator. However, because the reference signal is obtained through a smoothing circuit having a time constant determined by a capacitor and a resistor and wherein the three-valued code signal is subjected to full-wave rectification, there was a disadvantage in that the reference signal cannot follow the reproduced signal which varies instant by instant.

Moreover, if the magnetic recording and reproducing density is increased by using a magnetic head for multi-tracks, leak of magnetic flux is introduced between head gaps for recording and reproducing adjacent tracks of the multi-track magnetic head. Thus, crosstalk is introduced in signals reproduced from the adjacent tracks, and the signal-to-noise (S/N) ratio accordingly becomes poor, but this is the same problem introduced when the partial response system is applied. This problem is one of the elements which caused code error with respect to the accurate three-valued code signal of the reproduced signal and the level discrimination.

SUMMARY OF THE INVENTION

Accordingly, it is a general object of the present invention to provide a novel and useful magnetic reproducing system for a digital system, in which the above described problems have been eliminated.

Another and more specific object of the present invention is to provide a magnetic reproducing system for a digital signal in which a full-wave rectified output waveform of a three-valued code signal is sampled by a sampling pulse generated at substantially the peak value of the output waveform to obtain a reference signal by holding the sampled values, and levels of the reference signal and a three-valued code signal which is delayed for matching the timing are compared, in order to obtain a two-valued code signal having a waveform identical to that of a recorded two-valued code signal. According to the system of the present invention, the reference signal can follow instantaneous level deviation because the reference signal transmission line does not have a time constant. Moreover, it is possible to match the timing of the reference signal and the three-valued code signal, to considerably reduce the code error.

Still another object of the present invention is to provide a magnetic reproducing system for a digital signal in which a circuit part for level comparison is respectively provided for the positive and negative halfwaves of an input digital signal, so as to obtain the amplitude information of the input digital signal according to output signals of the circuit parts. The circuit part compares the level of a holding voltage of peak value holding means and the level of the input digital signal. The above peak value holding means holds a peak value of a half-wave rectified waveform on the input digital signal, and the above holding voltage is attenuated by the input digital signal when the level difference between the holding voltage becomes equal to or under a predetermined value. According to the system of the present invention, positive and negative peaks of the input signal can be detected accurately, because there is no unstable element such as a differentiating circuit and the holding voltage of the above peak value holding means is generated as a control voltage. The system according to the present invention is thus capable of detecting the amplitude information of the input digital signal with the high stability and accuracy, even when level deviation exists in the input digital signal or when there is instantaneous level deviation. Moreover, the code error factor is greatly improved over a system which detects peak values equal to or over a predetermined level, with respect to the input digital signal.

Another object of the present invention is to provide a magnetic reproducing system for a digital signal capable of finely reproducing an original digital signal by cancelling leakage signals introduced between adjacent tracks among multi-tracks upon reproduction.

Other objects and further features of the present invention will be apparent from the following detailed description when read in conjunction with the accompanying drawings.

DETAILED DESCRIPTION OF THE DRAWINGS

FIGS. 8(A) through 8(J) respectively are time charts for explaining the operation of the circuit shown in FIG. 7;

FIGS. 12(A) through 12(H) respectively are time charts for explaining the operation of the circuit shown in FIG. 11;

DETAILED DESCRIPTION

Figure 1:
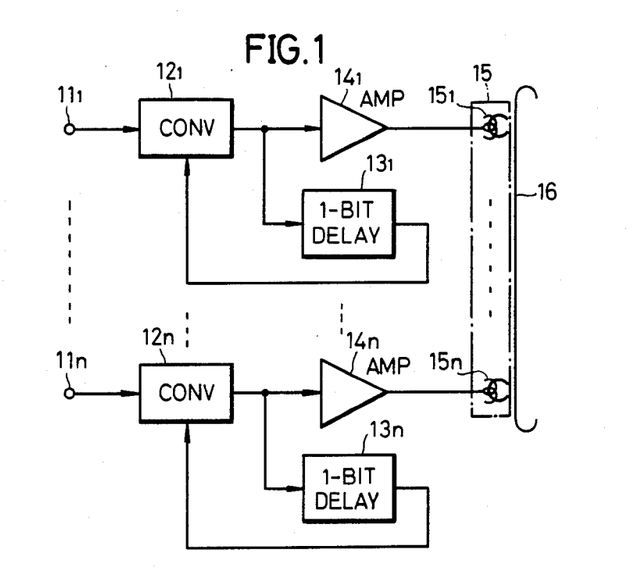
FIG. 1 is a system block diagram showing an example of a signal recording system for a magnetic tape which is to be reproduced by a magnetic reproducing system for a digital signal according to the present invention.
Figure 8:
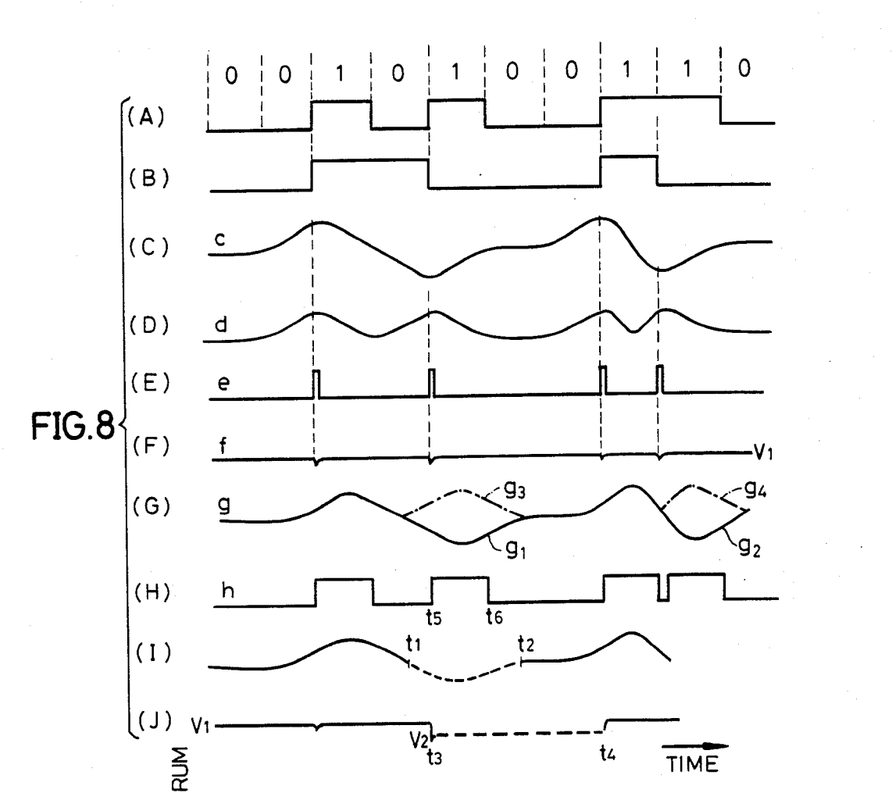

In FIG. 1, n (n is a natural number) input terminals $11_1$ through $11_n$ are respectively supplied with a divided two-valued code (sign) digital signal which is obtained by subjecting an audio signal of a plurality of channels to pulse-code-modulation (PCM), for example. The two-valued digital signal which is to be recorded, is supplied to converters $12_1$ through $12_n$. Modulo-2 adding operations are performed at these converters $12_1$ through $12_n$, between the two-valued code digital signal supplied thereto and corresponding output two-valued code digital signal of the converters $12_1$ through $12_n$ which is delayed by a 1-bit interval at corresponding 1-bit delay elements $13_1$ through $13_n$. Accordingly, the two-valued code digital signal to be recorded, is converted into a recording two-valued code digital signal. For example, if an incoming digital signal which is to be recorded to an input terminal $11_i$ (where i is an integer between 1 to n inclusive) has a waveform shown in FIG. 8(A), an output recording two-valued code digital signal of a converter $12_i$ becomes as shown in FIG. 8(B). In FIG. 8(A), numerals indicated above the signal waveform indicate the two-valued code (original data) which is to be recorded.

The recording two-valued code digital signals obtained from the converters $12_1$ through $12_n$, are respectively supplied to the 1-bit delay elements $13_1$ through $13_n$. On the other hand, the recording two-valued code digital signals obtained from the converters $12_1$ through $12_n$ are also respectively supplied to constant current amplifiers $14_1$ through $14_n$ wherein values of currents are appropriately varied. Outputs of these amplifiers $14_1$ through $14_n$ are respectively supplied to windings of n head gaps $15_1$ through $15_n$ of a multi-track recording and reproducing head 15, and thus recorded onto a magnetic tape 16 by the head gaps $15_1$ through $15_n$.

Figure 3:
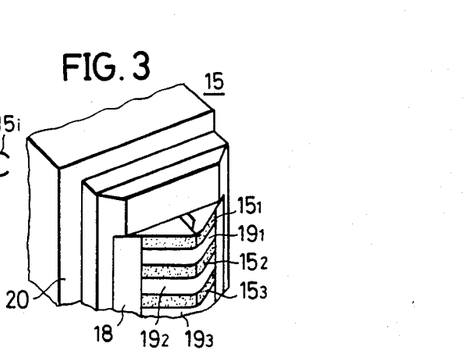
FIG. 3 is an enlarged partial perspective view showing a magnetic head used in the magnetic reproducing system according to the present invention.
Figure 4:
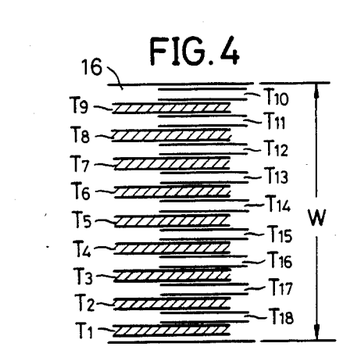
FIG. 4 is a diagram showing an example of a track pattern on a magnetic tape reproduced by the magnetic reproducing system according to the present invention.

A partial enlarged perspective view of the magnetic head 15 is shown in FIG. 3. As shown in FIG. 3, single crystal ferrite magnetic cores, for example, respectively having one head gap among the head gaps $15_1$ through 15n, and insulating members 191, 192, 193, ... respectively inserted between adjacent magnetic cores, are respectively provided on a glass base 18, and further accommodated in a case 20. The magnetic tape 16 travels in a direction perpendicular with respect to the longitudinal direction of the head gaps 151 through 15n. Accordingly, if the number n of the head gaps 151 through 15n is nine, for example, nine tracks T1 through T9 indicated by oblique lines in FIG. 4 are simultaneously recorded and formed when the magnetic tape 16 is caused to travel in a first direction. Next, when the side of the magnetic tape 16 is reversed by reversing the upper and lower sides thereof and the magnetic tape 16 is caused to travel in the same direction as that upon tape travel in the first direction, to perform recording in a second direction, nine tracks T10 through T18 shown in FIG. 4 are respectively formed simultaneously by the head gaps 151 through 159 between the tracks T1 through T9.

As seen from FIG. 4, the tracks T1 through T18 are parallel tracks formed along the longitudinal direction of the magnetic tape 16, and guard bands are formed between adjacent tracks. A tape width W is 3.81 mm, for example, in the case of a tape cassette. 2-bit delay elements may be used instead of the above 1-bit delay elements 131 through 13n.

Figure 2:
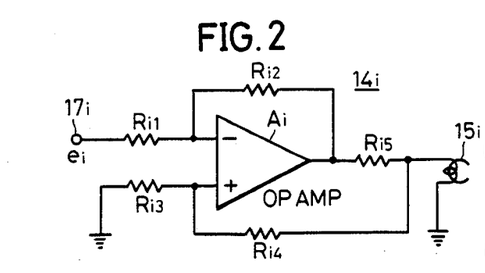
FIG. 2 is a circuit diagram showing an example of a constant current amplifier in the signal recording system shown in FIG. 1.

The constant amplifiers 141 through 14n respectively have the same construction. An arbitrary amplifier 14i among the amplifiers 141 through 14n is constructed from an operational amplifier Ai, and resistors Ri1 through Ri5 as shown in FIG. 2. Here, the resistances of the resistors Ri1 through Ri4 are selected so as to satisfy a relation $Ri2/Ri1=Ri4/Ri3=RY/RX$. In addition, if the impedance of the head gap 15i is designated by $Zi$ ($\Omega$), a relation $Ri3+Ri4>>Zi$ stands. Hence, if an input voltage $ei$ is applied to an input terminal 17i, a current $ei \cdot (RY \cdot Ri5/RX)$ (A) flows through the head gap 15i. This means that the recording current shows a flat characteristic even if the impedance $Zi$ of the head gap 15i changes due to the recording signal frequency. Further, when voltages are generated due to leakage magnetic flux at head gaps 15i−1 and 15i+1 (not shown) which record and form tracks adjacent to the track recorded and formed by the head gap 15i, both ends of resistors R(i−1)5 and R(i+1)5 (corresponding to the above resistor Ri5) respectively connected to the head gaps 15i−1 and 15i+1 become of the same potential, and a current does not flow through the head gaps 15i−1 and 15i+1. Accordingly, a leakage signal is prevented from being recorded onto the magnetic tape because a leakage current does not flow within the head gap which records and forms an adjacent track, even if there is leakage of the magnetic flux due to constructional causes and crosstalk is introduced.

Figure 5:
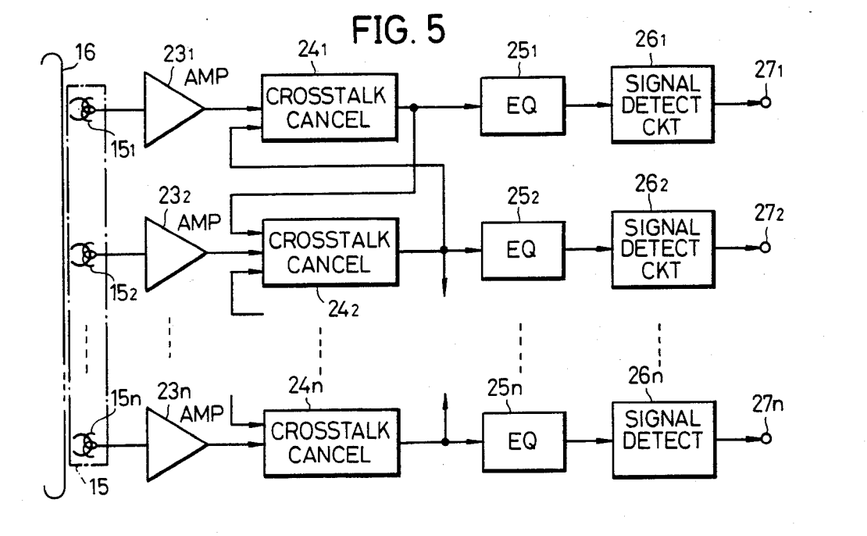
FIG. 5 is a system block diagram showing an embodiment of the magnetic reproducing system for a digital signal according to the present invention.

Next, description will be given with respect to an embodiment of a reproducing system according to the present invention. In FIG. 5, the magnetic tape 16 is recorded with the two-valued code digital signal shown in FIG. 8(B) on n tracks by the above described recording system. The magnetic tape 16 is caused to travel similarly as during the recording, and each track is respectively and separately reproduced by the head gaps 151 through 15n of the multi-track recording and reproducing head 15. When the two-valued code digital signal shown in FIG. 18(B) which is recorded on the magnetic tape 16 is reproduced by the head gaps 151 through 15n, a reproduced signal having a wavefrom shown in FIG. 8(C) is obtained due to the differentiating characteristic in accordance with the characteristic of each winding of the head gaps 151 through 15n. This reproduced signal shown in FIG. 8(C) assumes the form of a positive polarity pulse when the recording current is inverted to positive polarity from negative polarity, and assumes the form of a negative polarity pulse when the recording current is inverted to negative polarity from positive polarity. That is, the reproduced signal is a three-valued code (sign) signal wherein the positive polarity pulse corresponds to "+1", the zero level corresponds to "0", and the negative polarity pulse corresponds to "−1". This three-valued code signal is supplied to crosstalk cancellers 241 through 24n, through reproducing amplifiers 231 through 23n.

The crosstalk canceller 241 is supplied with a three-valued code signal from a first track to be reproduced which is obtained from the reproducing amplifier 231, and an output three-valued code signal of the crosstalk canceller 242 provided in a reproduced signal transmission system for a second track which is adjacent to the first track. On the other hand, the crosstalk canceller 242 is supplied with a three-valued code signal from the second track to be reproduced which is obtained from the reproducing amplifier 232, and output three-valued code signals of the crosstalk cancellers 241 and 243 provided in reproduced signal transmission systems for the first and third tracks adjacent to the second track. The other crosstalk cancellers 243 through 24n are similarly and respectively supplied with a three-valued code signal from a track to be reproduced, and three-valued code signals from tracks adjacent to the track to be reproduced.

Figure 6:
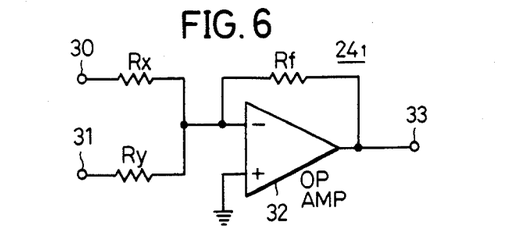
FIG. 6 is a circuit diagram showing an embodiment of a crosstalk cancelling circuit in the block system shown in FIG. 5.

An actual circuit diagram of an embodiment of a crosstalk canceller 241 is shown in FIG. 6. The output three-valued code signal of the reproducing amplifier 231 is supplied to an input terminal 30, while the output three-valued code signal of the crosstalk canceller 242 is supplied to an input terminal 31. These signals supplied to the input terminals 30 and 31 respectively pass through mixing resistors RX and RY, and then reach an inverting input terminal of an operational amplifier 32 which is connected with a feedback resistor Rf. Here, a crosstalk component in the range of approximately 20 dB from the adjacent track reproduced by the head gap 152 is mixed within the signal reproduced by the head gap 151, and this crosstalk component is also supplied to the above input terminal 30. On the other hand, the reproduced signal from the head gap 152 which is cancelled of the crosstalk component, is obtained at the output of the crosstalk canceller 242. This reproduced signal from the head gap 152 is a signal with an inverted phase of the crosstalk component within the signal supplied to the input terminal 30 (this is because the crosstalk cancellers 242 through 24n are of the same construction although the number of input terminals are different, and the input signal is inverted and amplified). Accordingly, by supplying the output signal of the crosstalk canceller 242 to the input terminal 241, and effecting mixing with respect to the signal supplied to the input terminal 30 with a level in the range of approximately −20 dB according to the crosstalk quantity, it is possible to substantially cancel the crosstalk component within the signal supplied to the input terminal 30. This signal thus substantially cancelled of the crosstalk component, is produced through an output terminal 33. The other crosstalk cancellers 242 through 24n operate similarly as the above described crosstalk canceller 241, and substantially cancel the crosstalk components.

The three-valued code signal thus substantially cancelled of the crosstalk component, is supplied to equalizers 251 through 25n. During the magnetic recording and reproducing process, the equalizers 251 through 25n compensates for the attenuated high-frequency component, and also establish a characteristic having a suitable band. Moreover, wave equalization is performed so that interference (intersymbol interference) does not occur between codes in the reproduced signal wavefrom itself. Hence, output signals of the equalizers 251 through 25n respectively become a three-valued code signal c shown in FIG. 8(C), which comprises signal levels corresponding to "+1", "0", and "−1" having no intersymbol interference. Each output three-valued code signal of the equalizers 251 through 25n is supplied to corresponding signal detection circuits 261 through 26n wherein the signal levels corresponding to "+1" and "−1" are converted to the signal level "+1", and the signal level "0" is maintained to the signal level "0", to obtain a two-valued code signal. Accordingly, the digital signal of the original code upon recording is restored, and then produced through output terminals 271 through 27n.

Figure 7:
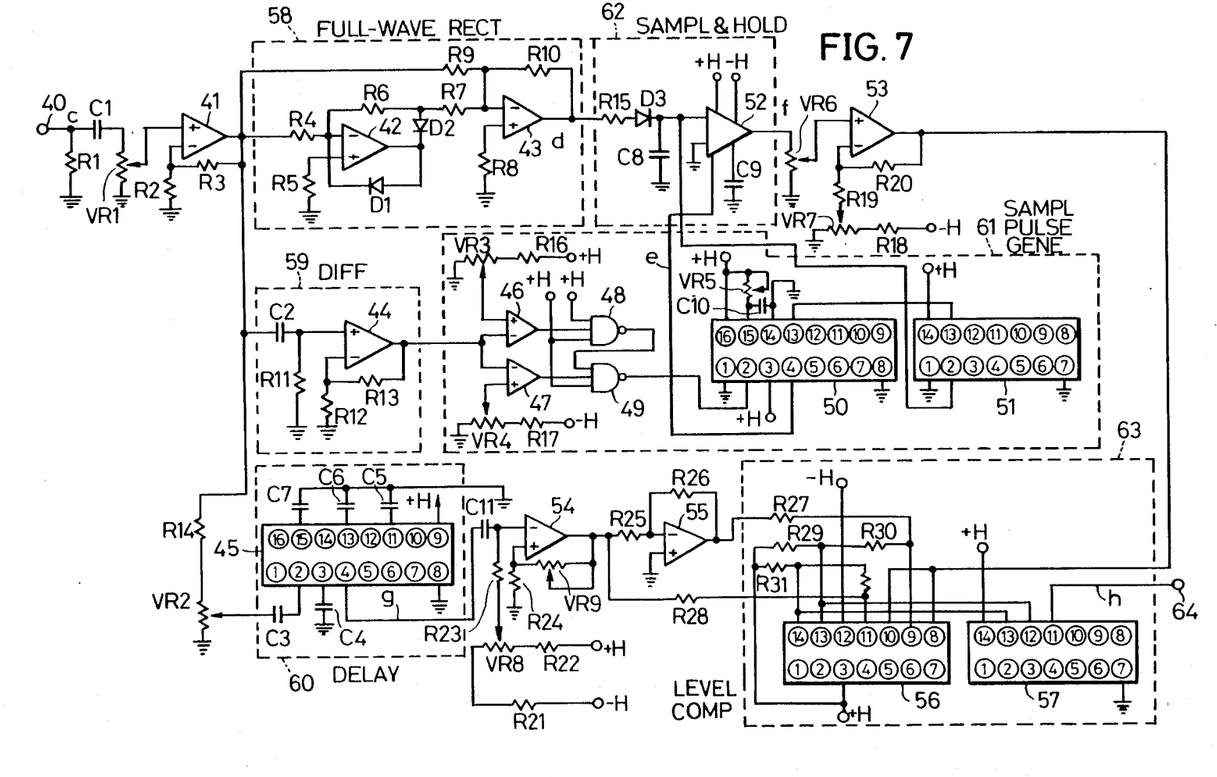
FIG. 7 is a concrete circuit diagram showing a first embodiment of a signal detection circuit in the block system shown in FIG. 5.

Next, detailed description will be given with respect to the signal detection circuits 261 through 26n. Since the signal detection circuits 261 through 26n are all of the same construction, description will be given with respect to the construction and operation of one signal detection circuit. FIG. 7 shows an actual circuit diagram of a first embodiment of the signal detection circuit. In FIG. 7, the output three-valued code signal c shown in FIG. 8(C) of an equalizer 25i, is applied to an input terminal 40 (shown at the left end of the figure). The three-valued code signal c is subjected to impedance conversion at a buffer amplifier comprising resistors R1 through R3, a capacitor C1, a variable resistor VR1, and an operational amplifier 41, and is then supplied to a full-wave rectifier 58 and a differentiator 59. The signal from the above buffer amplifier is also supplied to a delay circuit 60, through a resistor R14 and a variable resistor VR2.

The full-wave rectifier 58 comprises operational amplifiers 42 and 43, resistors R4 through R10, and diodes D1 and D2. Resistances of the resistors R4, R6, R7, and R9 are selected so as to satisfy a relation R6/R4=R9/2R7. Hence, a full-wave rectified signal d shown in FIG. 8(D) is obtained at an output terminal of the operational amplifier 43. This full-wave rectified signal d is supplied to a sample-and-hold (S/H) circuit 62. The S/H circuit 62 comprises a resistor R15, a diode D3, capacitors C8 and C9, and an integrated circuit chip (IC) 52 for the S/H circuit. The differentiator 59 comprises a differentiating circuit having a capacitor C2 and a resistor R11, and a non-inverting amplifier having an operational amplifier 44 and resistors R12 and R13. This differentiator 59 differentiates and then amplifies the input three-valued code signal c to a predetermined level, and generates a differentiated signal having zero crossings at positions corresponding to positive peak positions and negative peak positions of the three-valued code signal c. The differentiated signal thus generated, is supplied to a sampling pulse generator 61.

The sampling pulse generator 61 comprises operational amplifiers 46 and 47, 3-input NAND circuits 48 and 49, an IC 50 for monostable multivibrator, an IC 51 for analog switch, variable resistors VR3 through VR5, resistors R16 and R17, and a capacitor C10. In FIG. 7, "+H" and "−H" respectively indicate power source voltage, and for example, +H=+5 volts and −H=−5 volts. The differentiated signal obtained from the operational amplifier 44 is supplied to each inverting input terminal of the operational amplifiers 46 and 47 wherein the signal is respectively subjected to level comparison with positive and negative reference voltages adjusted by the variable resistors VR3 and VR4. Hence, the differentiated signals supplied to the operational amplifiers 46 and 47 are respectively converted into square waves, and then supplied to the NAND circuits 48 and 49. The positive power source voltage is supplied to the other two inputs of the NAND circuit 48, and an output of the NAND circuit 48 is supplied to the NAND circuit 49. Therefore, a pulse having a width in accordance with the zero crossing of the output differentiated signal of the differentiator 59, is obtained from the NAND circuit 49. That is, the center position of the pulse width of the pulse obtained from the NAND circuit 49, corresponds to the positive peak position or the negative peak position of the three-valued code signal c.

Accordingly, the above pulse from the NAND circuit 49 may be used as the sampling pulse. However, the pulse width of this pulse varies if the peak levels of the three-valued code signal c varies, to cause erroneous operation. Thus, in order to produce a sampling pulse of a constant pulse width, the above pulse is applied to a no. 2 pin of the IC 50, a monostable multivibrator. The IC 50 is triggered by the above pulse, and produces a pulse of a constant width through no.14 and no.13 pins, according to a time constant determined by an internal resistance of the IC 50, the capacitor C10, and the variable resistor VR5. A pulse e shown in FIG. 8(E) having a constant pulse width, which is produced through the no.4 pin of the IC 50, is applied to the IC 52 for S/H circuit as a sampling pulse. Moreover, a pulse having an inverted phase of the pulse e is simultaneously produced through the no.13 pin f the IC 50, and applied to a no.13 pin of the IC 51 for analog switch, to turn ON the IC 51 during the high-level period of the pulse.

The S/H circuit 62 samples the full-wave rectified signal d charged in the capacitor C8, at the high-level periods of the above sampling pulse e which is generated in correspondence with the peak level positions of the signal d. Then, the S/H circuit 62 holds the sampled value at the low-level periods of the sampling pulse e. In addition, because the IC 51 is turned ON during the low-level period of the sampling pulse e (holding period), the charged electrical charge in the capacitor C8 is discharged through a low impedance (in the range of 150Ω, for example) of the IC 51 which is turned ON. Thus, the charged voltage in the capacitor C8 is refreshed for every sampling. The S/H circuit 62 hence produces a voltage f shown in FIG. 8(F), and applies this voltage f as a reference signal to no. 8 and no. 10 pins of an IC 56 within a level comparator 63, through a non-inverting amplifier comprising a variable resistor VR6, resistors R19 and R20, and an operational amplifier 53. As seen from FIGS. 8(E) and 8(F), the reference signal f falls with the rise in the sampling pulse e because the circuit elements within the IC 52 is once instantaneously discharged.

The delay circuit 60 comprises capacitors C3 through C7, and an IC 45 for delay. This delay circuit 60 has a delay time of approximately ½-bit time interval, for example, for matching the timing, by taking into account the time lag between the input three-valued code signal c and the reference signal f. A delayed three-valued code signal obtained from the delay circuit 60 is indicated by a solid line g in FIG. 8(G). This delayed signal g is supplied to a non-inverting amplifier comprising variable resistors VR8 and VR9, resistors R21 through R24, and an operational amplifier 54, through a capacitor C11. The delayed signal g is thus non-inverted and amplified at this non-inverting amplifier, and applied to a no. 11 pin of the IC 56 through a resistor R28. On the other hand, the non-inverted and amplified delayed three-valued code signal g obtained from the operational amplifier 54, is simultaneously supplied to an inverting amplifier comprising resistors R25 and R26, and an operational amplifier 55. Therefore, the signal g supplied to this inverting amplifier is inverted and amplified, and then applied to a no. 9 pin of the IC 56 through a resistor R27.

A positive power source voltage is applied to a no. 3 pin of the IC 56. In addition, the power source voltage is applied to no. 9, no. 11, no. 13, and no. 14 pins of the IC 56, through a resisitor circuit comprising resistors R29 through R32. Furthermore, a negative power source voltage is applied to a no. 12 pin of the IC 56. The above IC 56 compares the levels of the reference signal f applied to the no. 8 pin and the delayed three-valued code signal g applied to the no. 11 pin, and the levels of the reference signal f applied to the no. 10 pin and the signal $\bar{g}$ applied to the no. 9 pin having the inverted phase of the signal g. The compared outputs are respectively applied to no. 12 and no. 13 pins of an IC 57, through the respective no. 13 and no. 14 pins of the IC 56. Here, the level of the reference signal f is set to approximately ½ the peak values of the delayed three-valued code signals g and $\bar{g}$, for example. Hence, a two-valued code signal in which the signal level is "+1" with respect to the signal level corresponding to "+1" of the delayed three-valued code signal g, and the signal level is "0" with respect to signal levels corresponding to "0" and "−1", is obtained from the no. 13 pin of the IC 56. On the other hand, a two-valued code signal in which the signal level is "+1" with respect to the signal level corresponding to "−1" of the above signal g, and the signal level is "0" with respect to signal levels corresponding to "0" amd "+1", is obtained from the no. 14 pin of the IC 56. The logical sum of the above two-valued code signals is obtained at the IC 57. Therefore, a two-valued code signal h shown in FIG. 8(H) is produced from the no. 11 pin of the IC 57 and supplied to an output terminal 64.

The above two-valued code signal h is a digital signal having the same code as the original two-valued code signal shown in FIG. 8(A). Accordingly, the original two-valued code signal upon recording can be restored from the three-valued code signal c and the signal detection circuit shown in FIG. 7.

When the level deviation exists in the delayed three-valued code signal g, level deviation is also introduced in the reference signal f according to the above level deviation in the signal g. Thus, the IC 56 carries out the level comparison regardless of the existence or non-existence of the level deviation, at a threshold level equal to approximately ½ the peak level of the three-valued code signal g. In addition, there is no circuit having a time constant, in the transmission line for the reference signal f. Hence, even if the level of the three-valued code signal g decreases between times t1 and t2 as shown in FIG. 8(I), for example, the reference signal f immediately follows this level decrease and assumes a level v2 from a normal level v1 as shown in FIG. 8(J).

The level v2 of the reference signal is held from a time t4 when there is an incoming sampling pulse e to a time t4. Therefore, the value of the output signal h of the level comparator 63 between times t5 and t6 corresponding to one bit of the two-valued code signal (the bit interval is substantially equal to t6−t5), is maintained constant.

Examples of the constants of circuit elements constructing the circuit shown in FIG. 7, is given below.

| Resistors | Resistances |
|---|---|
| R1 | 37 kΩ |
| R2, R15, R24, VR3, VR4, VR8 | 1 kΩ |
| R3, R18, R23 | 4.7 kΩ |
| R4, R6 | 20 kΩ |
| R5, R14, R16, R17, R21, R22, R27, R28, VR1, VR6, VR9 | 10 kΩ |
| R7 | 100 kΩ |
| R8 | 47 kΩ |
| R9, R10 | 200 kΩ |
| R11, R20, R25, R26 | 5.6 kΩ |
| R12 | 15 kΩ |
| R13 | 6.8 kΩ |
| R19 | 2.2 kΩ |
| R29, R31 | 2.7 kΩ |
| R30, R32 | 330 kΩ |
| VR2 | 5 kΩ |
| VR5 | 2 kΩ |
| VR7 | 200Ω |

| Capacitors | Capacitances |
|---|---|
| C1, C3, C4, C11 | 4.7 μF |
| C2 | 100 pF |
| C5, C7 | 150 pF |
| C6 | 120 pF |
| C8 | 390 pF |
| C9 | 6800 pF |
| C10 | 180 pF |

Figure 9:
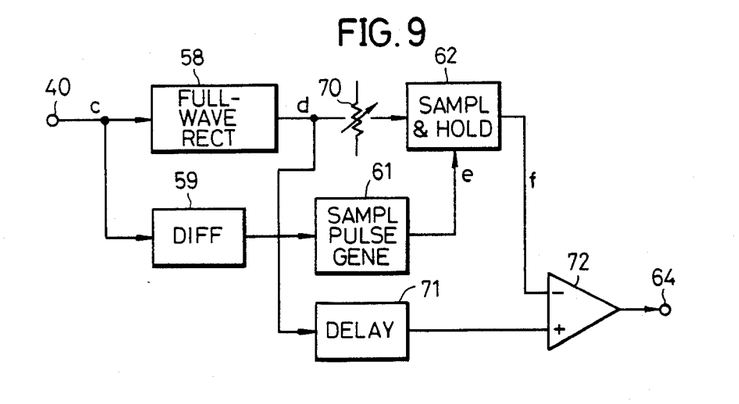
FIG. 9 is a system block diagram showing a second embodiment of the signal detection circuit in the block system shown in FIG. 5.

Next, description will be given with respect to a second embodiment of one signal detection circuit among the signal detection circuits 261 through 26n, by referring to FIG. 9. In FIG. 9, those parts which are the same as the corresponding parts in FIG. 7 are designated by the same reference numerals, and their description will be omitted. The full-wave rectified signal d shown in FIG. 8(D) which is obtained from the full-wave rectifier 58, is supplied to the S/H circuit 62, through a variable resistor 70 for determining a most suitable threhold level for the reference signal. The signal d from the full-wave rectifier 58 is also supplied to a delay circuit 71. In order to delay the above signal d, the delay circuit 71 produces a full-wave rectified signal in which signals portions g1 and g2 corresponding to the signal level "−1" in the delayed three-valued code signal g shown by the solid line in FIG. 8(G) are of a level corresponding to the signal level "+1" as indicated by one-dot chain lines g3 and g4 in FIG. 8(G).

The full-wave rectified signal which is delayed by a predetermined time so as to match the timing with the reference signal f, is obtained from the delay circuit 71 and supplied to a level comparator 72. The levels of the delayed full-wave rectified signal and the reference signal f obtained from the S/H circuit 62, are thus compared at the level comparator 72. An output signal of the level comparator 72 has the signal level "+1" with respect to the signal level "+1" of the delayed rectified signal and has the signal level "0" with respect to the signal level corresponding to "0", and is the same as the digital signal h shown in FIG. 8(H) having the same code as the original two-valued code.

Compared to the first embodiment shown in FIG. 7, the level comparator 72 may be constructed from a single comparator. Moreover, the circuit construction is simplified and the cost is accordingly reduced, since it is not necessary to provide the inverting amplifier comprising the amplifier 55 and the like. In the present embodiment, stability is obtained with respect to the level deviation in the reproduced signal, as in the above described first embodiment. Furthermore, even if jitter exists within the reproduced signal, the timings of the reference signal f and the delayed rectified signal at the level comparator 72 coincide because these signals are both derived from the same three-valued code signal.

Figure 10:
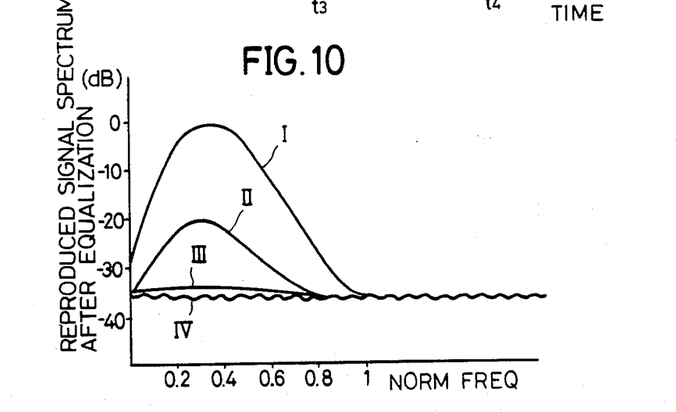
FIG. 10 is a graph showing an example of a crosstalk characteristic of the magnetic reproducing system according to the present invention.

FIG. 10 shows a crosstalk characteristic of the reproducing system according to the present invention. In FIG. 10, the spectrum of the output three-valued code signal of the equalizers 25I through 25n is indicated by a curve I, and a curve II indicates the crosstalk quantity from adjacent tracks. In FIG. 10, the horizontal axis indicates the normalization frequency, that is, the ratio between the frequency of the signal applied to the terminal 40 and the bit frequency. The crosstalk quantity II is greatly suppressed by the crosstalk cancellers 24I through 24n having the construction shown in FIG. 6, to a curve III. This curve III is quite close to a noise level curve IV.

According to the reproducing system of the present invention, the recorded two-valued code signal on the multi-tracks is reproduced as the three-valued code signal. The S/N ratio of the reproduced three-valued code signal is improved by the crosstalk cancellers 24I through 24n, and the three-valued code signal is restored into the two-valued code signal by use of the partial response system. As a result, the signal level can be discriminated with higher accuracy, and the code error is considerably reduced, to enable fine reproduction of the original two-valued code digital signal.

Figure 11:
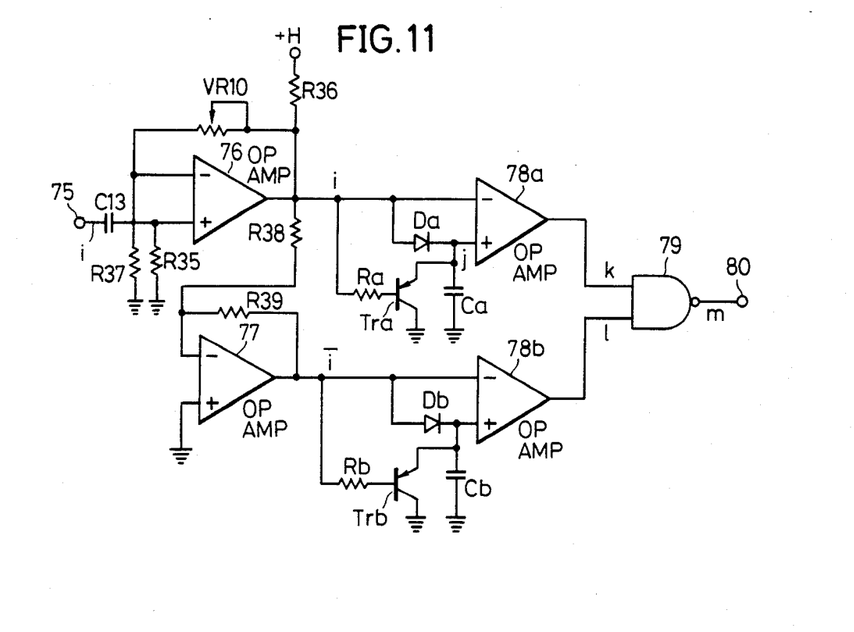
FIG. 11 is a concrete circuit diagram showing a third embodiment of the signal detection circuit shown in FIG. 5.

Next, description will be given with respect to a third embodiment of the signal detection circuit shown in the concrete circuit diagram of FIG. 11. In FIG. 11, a three-valued code signal i shown in FIG. 12(C) from the equalizer 25i, is applied to an input terminal 75. This three-valued code digital signal i is a signal similar to the three-valued code signal shown in FIG. 8(C). FIG. 12(A) shows the two-valued code didital signal which is to be recorded. In order to perform recording and reproduction in accordance with the partial response system, the above digital signal shown in FIG. 12(A) is converted into a digital signal shown in FIG. 12(B) and then recorded onto the magnetic tape 16 as in the above described case. As described above, the three-valued code signal i shown in FIG. 12(C) is a signal obtained by reproducing the digital signal shown in FIG. 12(B) which is recorded on the multi-tracks on the magnetic tape.

The three-valued code signal i is applied to a non-inverting input terminal of an operational amplifier 76, through circuit comprising a capacitor C13 and a resistor R35. This operational amplifier 76 constructs a non-inverting amplifier together with resistors R36 and R37 and a variable resistor VR10. The non-inverted and amplified three-valued code signal i from the non-inverting amplifier is supplied to an inverting input terminal of an operational amplifier 78a for level comparison, and also supplied to an inverting amplifier comprising resistors R38 and R39 and an operational amplifier 77. An inverted and amplified three-valued code signal i obtained from this inverting amplifier, is applied to an inverting input terminal of an operational amplifier 78b for level comparison.

Here, a first circuit part from the operational amplifier 76 to the operational amplifier 78a, and a second circuit part from the operational amplifier 77 to the operational amplifier 78b, are of the same construction. Hence, the corresponding circuit elements in these first and second circuit parts are designated by the same reference characters with a subscript "a" for those elements in the first circuit part and with a subscript "b" for those elements in the second circuit part. Output terminals of the operational amplifiers 76 and 77 are respectively connected to inverting input terminals of the operational amplifiers 78a and 78b. These output terminals of the operational amplifiers 76 and 77 are also respectively connected to non-inverting input terminals of the operational amplifiers 78a and 78b, through rectifying diodes Da and Db. connection points between the cathodes of the diodes Da and Db and the non-inverting input terminals of the operational amplifiers 78a and 78b, are respectively grounded through peak value holding capacitors Ca and Cb. These connection points are also respectively connected to emitters of PNP transistors Tra and Trb for switching. The collectors of the transistors Tra and Trb are grounded. The bases of the transistors Tra and Trb are respectively connected to the output terminals of the operational amplifiers 76 and 77, through resistors Ra and Rb. The output terminals of the operational amplifiers 78a and 78b are respectively connected to each input terminal of a 2-input NAND circuit 79. Other switching elements may of course be used instead of the above transistors Tra and Trb.

Figure 12:
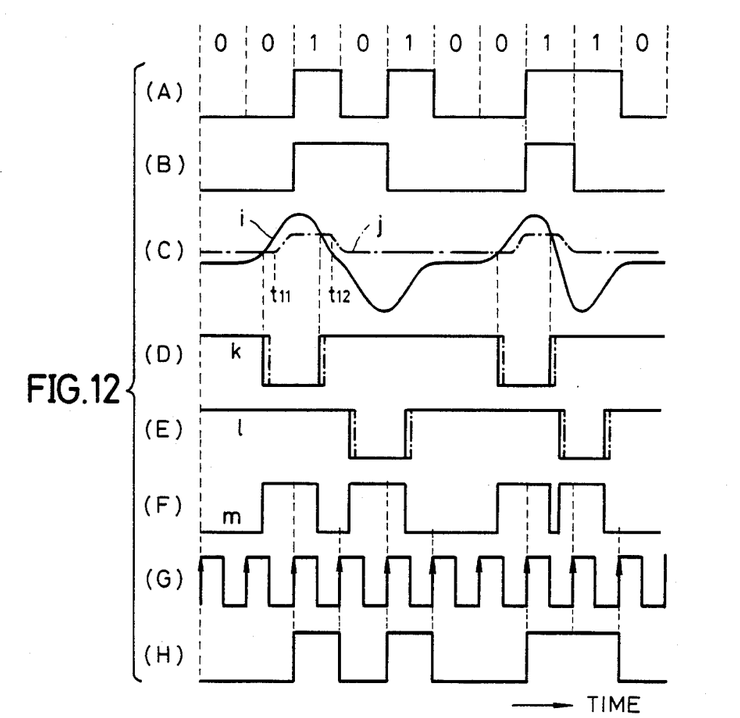

In the signal detection circuit of the above described construction, when the above three-valued code signal i increases towards the positive direction to reach a predetermined level at a time t11 indicated in FIG. 12(C), the diode Da is turned ON, and the three-valued code signal i is applied to the capacitor Ca through the diode Da to charge the capacitor Ca. The voltage between terminals of the charged capacitor Ca (this terminal voltage is equal to the input voltage to the non-inverting input terminal of the operational amplifier 78a and the emitter voltage of the transistor Tra) follows the increase in the positive direction of the three-valued code signal i as indicated by a one-dot chain line j in FIG. 12(C). This terminal voltage of the capacitor Ca thus follows up to a voltage lower than the signal level of the three-valued code signal i by a threshold voltage VTH1 of the diode Da. When the signal level of the three-valued code signal i reaches the peak thereafter, the signal i then begins to decrease in level. However, because the diode Da and the transistor Tra are both in the OFF state, the terminal voltage j of the capacitor Ca is maintained at the charged voltage obtained at the positive peak of the three-valued code signal i as shown in FIG. 12(C), even though the signal level of the signal i decreases. At a time T12 indicated in FIG. 12(C) when the signal level of the three-valued code signal i becomes lower than the terminal voltage j of the capacitor Ca by a threshold voltage VTH2 of the transistor Tra, the transistor Tra is turned ON by the three-valued code signal i applied to the base thereof.

When the transistor Tra turns ON, the stored electrical charge in the capacitor Ca is instantaneously discharged through the emitter-collector resistance of the transistor Tra which becomes of a low impedance. Thus, the terminal voltage j of the capacitor Ca decreases to a voltage substantially equal to the ground level (strictly speaking, the emitter-collector loss voltage of the transistor Tra). In addition, during the discharge period of the capacitor Ca or immediately prior to this discharge period, the signal level difference between the three-valued code signal i and the terminal voltage j of the capacitor Ca becomes lower than the threshold voltage VTH1 of the diode Da, and the diode Da is accordingly turned OFF. After the terminal voltage j of the capacitor Ca becomes substantially equal to the ground level, the signal level of the three-valued code signal i continues to decrease and reaches the negative peak. Thereafter, the signal level of the signal i begins to increase in the positive direction from the negative peak. However, because the transistor Tra is in the ON state until the signal level difference between the three-valued code signal i and the terminal voltage j of the capacitor Ca becomes higher than the above threshold voltage VTH1, the terminal voltage j of the capacitor Ca remains at the level substantially equal to the ground level, as indicated by the one-dot chain line in FIG. 12(C). Thereafter, operations similar to those described above is repeatedly performed.

The terminal voltage j of the capacitor Ca obtained by switching and controlling the transistor Tra by the three-valued code signal i and controlling the charging and discharging operations of the capacitor Ca, is applied to the non-inverting input terminal of the operational amplifier 78a as a control voltage. The level of the terminal voltage j thus applied to the operational amplifier 78a, is compared with the level of the three-valued code signal i appled to the non-inverting input terminal thereof. If the operational amplifier 78a does not have a hysteresis characteristic, the output signal wavefrom of the operational amplifier 78a obtained as a result of the level comparison becomes as indicated by a solid line in FIG. 12(D). The voltage indicated by the solid line in FIG. 12(D) is a two-valued voltage varying to low level from high level or to high level from low level at intersecting points between the above signals i and j. On the other hand, if the operational amplifier 78a has a hysteresis characteristic, the output voltage of the operational amplifier varies as indicated by a one-dot chain line in FIG. 12(D).

Similarly, if the operational amplifier 78b does not have a hysteresis characteristic, the signal obtained from the operational amplifier 78b as a result of level comparison, varies as indicated by a solid line in FIG. 12(E). On the other hand, if the operational amplifier 78b has a hysteresis characteristic, the output signal of the operational amplifier 78b varies as indicated by a one-dot chain line in FIG. 12(E). An output two-valued code signal k of the operational amplifier 78a shown in FIG. 12(D), and an output two-valued code signal l of the operational amplifier 78b, are respectively applied to the NAND circuit 79. The NAND circuit 79 thus prodces a two-valued code signal m shown in FIG. 12(F) by converting the above signals k and l, and produces this signal m as a three-valued code signal detection sinal through an output terminal 80. The detection signal m corresponds to the above described detection signal h shown in FIG. 8(H), and has a signal level substantially corresponding to the original data of the two-valued code signal shown in FIG. 12(A) which is to be recorded and reproduced.

The above detection signal m is applied to a data terminal of a delay type (D-type) flip-flop (not shown), for example, through the output terminal 80. By applying a clock pulse having a phase and frequency shown in FIG. 12(G) to a clock input terminal of this D-type flip-flop, the input detection signal m to the data terminal can be latched by the rise in the clock pulse. Thus, as shown in FIG. 12(H), a two-valued code signal having a timing matched with that of the original two-valued code signal shown in FIG. 12(A), can accurately be reproduced and produced through a Q-output terminal of the above D-type flip-flop.

Figure 13:
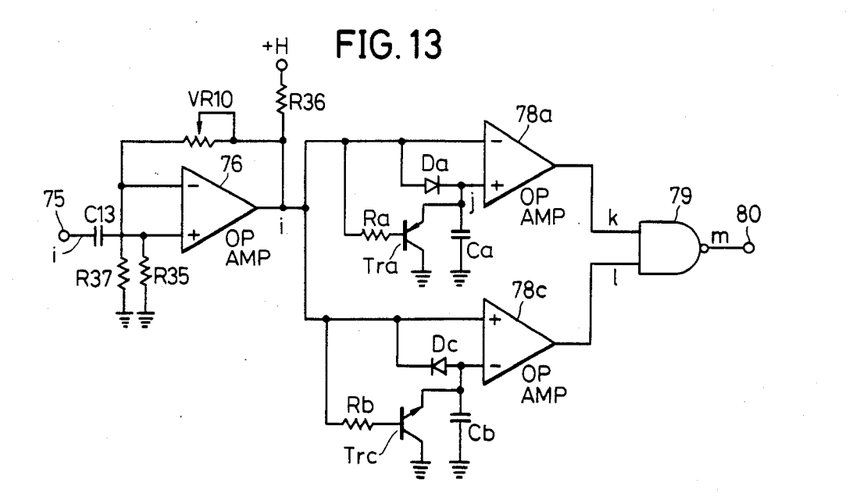
FIG. 13 is an actual circuit diagram showing a fourth embodiment of the signal detection circuit shown in FIG. 5.

Next, description will be given with respect to a fourth embodiment of one signal detection circuit among the signal detection circuits 26, through 26n, by referring to FIG. 13. In FIG. 13, those parts which are the same as those corresponding parts in FIG. 11 are designated by the same reference numerals, and their description will be omitted. In FIG. 13, the three-valued code signal i indicated by the solid line in FIG. 12(C) which is obtained from the operational amplifier 76 after being non-inverted and amplified, is applied to the base of an NPN transistor Trc through the resistor Rb. In addition, the above three-valued code signal i is also applied to a non-inverting input terminal of an operational amplifier 78c. The non-inverting input terminal of the operational amplifier 78c is connected to the cathode of a diode Dc. On the other hand, an inverting input terminal of the above operational amplifier 78c is connected to the anode of the diode Dc, the emitter of the transistor Trc, and the capacitor Cb. Accordingly, as the three-valued code signal i decreases toward the negative direction from a signal level corresponding to "0", the transistor Trc becomes OFF while the diode Dc becomes ON, to charge the capacitor Cb. When the three-valued code signal i reaches the negative peak and thereafter increases toward the positive direction, the charged voltage in the capacitor Cb is held because the diode Dc becomes OFF and the transistor Trc also becomes OFF.

When the three-valued code signal i further increases in the positive direction and becomes higher than the charged voltage in the capacitor Cb and higher than a threshold voltage of the transistor Trc, the transistor Trc is turned ON. Accordingly, the charged electrical charge in the capacitor Cb is instantaneously discharged through the transistor Trc which is in the ON state. Thus, the operational amplifier 78c produces the two-valued code signal l shown in FIG. 12(E).

According to the present embodiment, it is not necessary to provide the operational amplifier 77 and the resistors R38 and R39 which are required in the above described third embodiment. Therefore, the circuit construction becomes simple, and the cost of the circuit is reduced.

Examples of constants of the circuit elements constructing the signal detection circuit shown in FIGS. 11 and 13, are given below.

| Resistors | Resistances |
| --- | --- |
| R35, R37 | 10 kΩ |
| R36 | 470Ω |
| R38, | 5.6 kΩ |
| VR10 | 20 kΩ |
| Ra, Rb | 1.2 kΩ |
| Capacitors | Capacitances |
| Ca, Cb | 390 μF |

Figure 14:
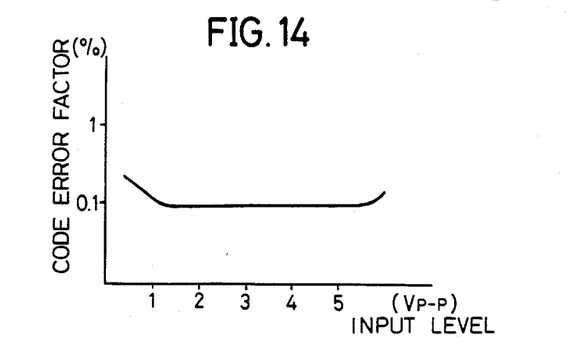
FIG. 14 is a graph showing an example of a relationship between the input signal level of the circuits shown in FIGS. 11 and 13 and the code error factor.

FIG. 14 shows an input level versus code error factor characteristics for a case where a magnetic tape recorded with an M-series random code signal is reproduced and the signal detection is performed by the signal detection circuit shown in FIG. 11 or FIG. 13. In FIG. 14, the vertical axis indicates the code error factor, and the horizontal axis indicates the signal level of the input three-valued code signal to the input terminal 75. As clearly seen from FIG. 14, the code error factor is constant and assumes an exceedingly low value of 0.1% when the input three-valued code signal is in a range between 1.2 Vp-p (peak-to-peak) and 5.5 Vp-p. Thus, the signal detection can be performed with high stability and accuracy. This is because the control voltage j is produced by immediately responding to the three-valued code signal i, and the positive and negative peaks of the three-valued code signal i can be detected accurately.

As seen from FIG. 14, the code error factor increases with respect to the input three-valued code signal i of over 5.5 Vp-p. However, this is because the noise level increases according to the input level, and the noise introduces erroneous operation as data although the signal level is zero. The code error factor also increases when the input three-valued code signal i becomes less than 1.2 Vp-p. This is because the threshold voltages of the diodes Da, Db, and Dc exist between the relationship of the three-valued code signal i and the control voltage j, and sufficient signal detection cannot be performed with respect to deviation within these threshold voltages. But compared to a reproducing system in which the control voltage j is set to a specific value and the peak value over a predetermined value is detected with respect to the input three-valued code signal i, the code error factor may be reduced greatly to a range in the order of 1/10 and improved over the above reproducing system, by the above described third and fourth embodiments.

Moreover, the signal detection may also be performed when the input signal is a two-valued code signal other than the above-three-valued code signal.

Further, the present invention is not limited to these embodiments, but various variations and modifications may be made without departing from the scope of the present invention.

What is claimed is:

1. A magnetic reproducing system for a digital signal, for reproducing a recording two-valued code signal from a magnetic recording medium, and detecting the signal level of the reproduced signal to reproduce a digital signal of a desired two-valued code, said recording two-valued code signal being obtained by passing said digital signal of said desired two-valued code through a converter and delay means and then feeding back this digital signal to said converter to carry out a modulo-2 addition, said magnetic recording medium being recorded with said recording two-valued code signal, said magnetic reproducing system comprising:

a magnetic head for reproducing said two-valued code recorded on said magnetic recording medium;

an equalizer for performing wave-equalization of the signal reproduced by said magnetic head; and a signal detection circuit for detecting the signal level of a three-valued code signal obtained from said equalizer, to produce a two-valued detection signal in which signal levels corresponding to "+1" and "−1" of said three-valued code signal is set to a signal level "+1" and a signal level corresponding to "0" of said three-valued code signal is set to a signal level "0", as a reproduced output signal of said digital signal, said signal detection circuit comprising a full-wave rectifier for producing a full-wave rectified signal from the three-valued code signal obtained from said equalizer, sampling pulse generation means supplied with said three-valued code signal for generating a sampling pulse with a phase substantially corresponding to peak value positions of the signal levels corresponding to "+1" and "−1" of said three-valued code signal, a sample and hold circuit for sampling an output signal of said full-wave rectifier with an output sampling pulse of said sampling pulse generation means and holding the sampled value, a delay circuit for delaying said three-valued code signal so as to match the timing with an output reference signal of said sample and hold circuit, and level comparing circuit means for comparing the levels of the output reference signal of said sample and hold circuit and a delayed three-valued code signal obtained from said delay circuit, to obtain a two-valued code signal having a waveform substantially identical to the digital signal of said desired two-valued code.

2. A magnetic reproducing system for a digital signal, for reproducing a recording two-valued code signal from a magnetic recording medium, and detecting the signal level of the reproduced signal to reproduce a digital signal of a desired two-valued code, said recording two-valued code signal being obtained by passing said digital signal of said desired two-valued code through a converter and delay means and then feeding back this digital signal to said converter to carry out a modulo-2 addition, said magnetic recording medium being recorded with said recording two-valued code signal, said magnetic reproducing system comprising:

a magnetic head for reproducing said two-valued code recorded on said magnetic recording medium;

an equalizer for performing wave-equalization of the signal reproduced by said magnetic head; and a signal detection circuit for detecting the signal level of a three-valued code signal obtained from said equalizer, to produce a two-valued detection signal in which signal levels corresponding to "+1" and "−1" of said three-valued code signal is set to a signal level "+1" and a signal level corresponding to "0" of said three-valued code signal is set to a signal level "0", as a reproduced output signal of said digital signal, said signal detection circuit comprising a full-wave rectifier for producing a full-wave rectified signal from the three-valued code signal obtained from said equalizer, sampling pulse generation means supplied with said three-valued code signal for generating a sampling pulse with a phase substantially corresponding to peak value positions of the signal levels corresponding to "+1" and "−1" of said three-valued code signal, a sample and hold circuit for sampling an output signal of said full-wave rectifier with an output sampling pulse of said sampling pulse generation means and holding the sampled value, a delay circuit for delaying an output signal of said full-wave rectifier so as to match the timing with an output reference signal of said sample and hold circuit, and level comparing circuit means for comparing the levels of the output reference signal of said sample and hold circuit and a delayed full-wave rectified signal, to obtain a two-valued code signal having a waveform substantially identical to the waveform of the digital signal of said desired two valued code.

3. A reproducing system for a digital signal, for reproducing a recording two-valued code signal from a magnetic recording medium, and detecting the signal level of the reproduced signal to reproduce a digital signal of a desired two-valued code, said recording two-valued code signal being obtained by passing said digital signal of said desired two-valued code through a converter and delay means and then feeding back this digital signal to said converter to carry out a modulo-2 addition, said magnetic recording medium being recorded with said recording two-valued code signal, said magnetic reproducing system comprising:

a magnetic head for reproducing said two-valued code recorded on said magnetic recording medium;

an equalizer for performing wave-equalization of the signal reproduced by said magnetic head; and a signal detection circuit for detecting the signal level of a three-valued code signal obtained from said equalizer, to produce a two-valued detection signal in which signal levels corresponding to "+1" and "−1" of said three-valued code signal is set to a signal level "+1" and a signal level corresponding to "0" of said three-valued code signal is set to a signal level "0", as a reproduced output signal of said digital signal, said signal detection circuit comprising first peak value holding means for subjecting the three-valued code signal obtained from said equalizer to positive half-wave rectification and holding the peak value of the positive half-wave rectified signal, second peak value holding means of subjecting said three-valued code signal to negative half-wave rectification and holding the peak value of the negative half-wave rectified signal, first and second switching means provided in correspondence with said first and second peak value holding means, for respectively attenuating voltages held by said first and second peak value holding means when the signal level difference between said three-valued code signal and the voltage held by said first peak value holding means and the signal level difference between said three-valued code signal and the voltage held by said second peak value holding means becomes less than a specific level, a first level comparator for comparing signal levels of the voltage held at said first peak value holding means and said three-valued code signal, a second level comparator for comparing signal levels of the voltage held at said second peak value holding means and said three-valued code signal, and a gate circuit supplied with output signals of said first and second level comparators, for producing logic output of the amplitude information of said three-valued code signal.

4. A reproducing system as claimed in claim 3 in which said first peak value holding means comprises a first diode for rectifying the positive half-wave of the three-valued code signal obtained from said equalizer, and a first capacitor supplied with a rectified output signal of said first diode, said first switching means is a PNP type transistor having a base supplied with said three-valued code signal and collector and emitter respectively connected to both terminals of said first capacitor, said second peak value holding means comprises an inverting amplifier for inverting and amplifying said three-valued code signal, a second diode for rectifying the positive half-wave of an output signal of said inverting amplifier, and a second capacitor supplied with a rectified output signal of said second diode, and said second switching means is a PNP type transistor having a base supplied with the output signal of said inverting amplifier and collector and emitter respectively connected to both terminals of said second capacitor.

5. A reproducing system as claimed in claim 3 in which said first peak value holding means comprises a first diode for rectifying the positive half-wave of the three-valued code signal obtained from said equalizer, and a first capacitor supplied with a rectified output of said first diode, said first switching means is a PNP type transistor having a base supplied with said three-valued code signal and collector and emitter respectively connected to both terminals of said first capacitor, said second peak value holding means comprises a second diode for rectifying the negative half-wave of said three-valued code signal, and a second capacitor supplied with a rectified output of said second diode, and said second switching means is an NPN type transistor having a base supplied with said three-valued code signal and collector and emitter respectively connected to both terminals of said second capacitor.

6. A magnetic reproducing system for a digital signal, for reproducing a recording two-valued code signal from a magnetic recording medium, and detecting the signal level of the reproduced signal to reproduce a digital signal of a desired two-valued code, said recording two-valued code signal being obtained by passing said digital signal of said desired two-valued code through a converter and delay means and then feeding back this digital signal to said converter to carry out a modulo-2 addition, said magnetic recording medium being recorded with said recording two-valued code signal, said magnetic reproducing system comprising:

a magnetic head for reproducing said two-valued code recorded on said magnetic recording medium;

an equalizer for performing wave-equalization of the signal reproduced by said magnetic head; and a signal detection circuit for detecting the signal level of a three-valued code signal obtained from said equalizer, to produce a two-valued detection signal in which signal levels corresponding to "+1" and "−1" of said three-valued code signal is set to a signal level "+1" and a signal level corresponding to "0" of said three-valued code signal is set to a signal level "0", as a reproduced output signal of said digital signal, said magnetic head being a multi-track reproducing head, said equalizer and said signal detection circuit respectively being of a number in correspondence with the number of head gaps in said magnetic head, said equalizer being supplied with the recorded two-valued code signal reproduced from one track by one of said corresponding head gaps, and with an output three-valued code signal of a crosstalk canceller circuit, said crosstalk canceller circuit being supplied with a three-valued signal obtained by reproducing the recorded two-valued code signal from one track by one head gap of said multi-track reproducing head and a signal reproduced from a track adjacent to said one track, to produce the output three-valued code signal by substantially suppressing a crosstalk component from said adjacent track within said reproduced three-valued code signal.

* * * * *